(12) United States Patent
Itou

(10) Patent No.: US 8,872,495 B2
(45) Date of Patent: Oct. 28, 2014

(54) DC-DC CONVERTER CIRCUIT

(75) Inventor: Masaki Itou, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 123 days.

(21) Appl. No.: 13/448,560

(22) Filed: Apr. 17, 2012

(65) Prior Publication Data

US 2012/0286755 A1 Nov. 15, 2012

(30) Foreign Application Priority Data

May 11, 2011 (JP) ................................. 2011-105998

(51) Int. Cl.
G05F 1/00 (2006.01)
H02M 1/36 (2007.01)
H02M 3/156 (2006.01)
H02M 1/00 (2006.01)

(52) U.S. Cl.
CPC ........ *H02M 1/36* (2013.01); *H02M 2001/0006* (2013.01); *H02M 3/156* (2013.01)
USPC .......................................................... 323/284

(58) Field of Classification Search
USPC ................................................. 323/282–285
See application file for complete search history.

(56) References Cited

U.S. PATENT DOCUMENTS

| 6,552,516 | B2 * | 4/2003 | Hwang et al. | 323/274 |
| 7,573,251 | B2 * | 8/2009 | Yang et al. | 323/303 |
| 2002/0166073 | A1 * | 11/2002 | Nguyen et al. | 713/300 |

FOREIGN PATENT DOCUMENTS

| JP | 7-264066 A | 10/1995 |
| JP | 2003-244942 A | 8/2003 |

\* cited by examiner

*Primary Examiner* — Adolf Berhane
*Assistant Examiner* — Henry Lee, III
(74) *Attorney, Agent, or Firm* — Keating & Bennett, LLP

(57) ABSTRACT

A DC-DC converter circuit includes a DC-DC converter IC that inputs, via an input terminal connected to a power supply input line, a direct-current voltage converted from an alternating-current voltage and supplied by the power supply input line. The DC-DC converter IC outputs a direct-current voltage having a value converted by operation of the DC-DC converter IC. The DC-DC converter IC is able to operate when a voltage of a specified threshold value or greater is input from an enable terminal. The DC-DC converter circuit also includes an enable control circuit that makes the voltage input to the enable terminal equal to the threshold voltage or greater when the direct-current voltage supplied from the power supply input line reaches a specified value.

3 Claims, 3 Drawing Sheets

DC-DC CONVERTER CIRCUIT

BACKGROUND OF THE INVENTION

1. Field of the Invention

The present invention relates to a DC-DC converter circuit.

2. Description of the Related Art

A known DC-DC converter circuit (DC-DC converter) converts an input direct-current voltage to a direct-current voltage of a different value and outputs it as a power supply voltage to a later-stage circuit. The DC-DC converter circuit includes an integrated circuit (IC) which constitutes a control center thereof.

Furthermore, a known digital-to-analog converter device (D/A converter) includes a logic buffer equipped with a chip-enable terminal that sends an output to an amplifier with an output of the D/A converter as the input, and a control circuit that sends a disenable signal to the chip-enable terminal during a period when the power supply is unstable and that sends an enable signal to the chip-enable terminal in a state in which the power supply is stable (see Japanese Patent Application Laid-Open Publication No. H7-264066).

Furthermore, a known DC-DC converter has a main switching element that is not turned on immediately by the control circuit IC outputting pulse signals, and after a certain period of time has elapsed, the main switching element performs output, such that when the output voltage of the main switching element does not reach the threshold value at a minimum pulse width, the DC-DC converter prevents incomplete output voltage with respect to the rated output voltage that normally occurs at this point or overshoot that occurs in this case (see Japanese Patent Application Laid-Open Publication No. 2003-244942).

In electrical appliances which have a built-in DC-DC converter circuit such as that described above, when a power cord (AC cord) is connected to a commercial alternating-current power supply, the voltage input to the DC-DC converter circuit via a power supply circuit which executes AC-DC conversion rises over a specified time from 0 V to reach a substantially constant value. In terms of design, the DC-DC converter circuit has something called a minimum operating voltage value set for the input voltage, and the input voltage must be the minimum operating voltage value or greater in order for the IC to operate. Meanwhile, during the time from when the AC cord is connected to the commercial alternating-current power supply until the input voltage to the DC-DC converter circuit stabilizes at a substantially constant value, there are cases in which the input voltage becomes unstable near the minimum operating voltage value due to the effect of a load or the like on the later-stage circuit, and in such cases, the IC may end up operating before the input voltage to the DC-DC converter circuit stabilizes, making it possible for an IC malfunction, disordered output values from the DC-DC converter circuit, and the like to occur. Note that for each of the known devices described above, the structure is insufficient to eliminate the instability of the DC-DC converter circuit caused by instability of the input voltage which can occur when connecting to such an external commercial alternating-current power supply.

SUMMARY OF THE INVENTION

In view of the problems described above, preferred embodiments of the present invention provide a DC-DC converter circuit capable of providing a stable supply of power by reliably preventing operation before the input voltage is stabilized.

According to a preferred embodiment of the present invention, a DC-DC converter circuit includes a DC-DC converter IC that inputs, via an input terminal connected to a power supply input line, a direct-current voltage converted from alternating-current voltage and supplied by the power supply input line, the DC-DC converter IC being arranged to output a direct-current voltage having a value converted by operation of the DC-DC converter IC, wherein the DC-DC converter IC operates when a voltage of a specified threshold value or greater is input from an enable terminal, and the DC-DC converter circuit includes an enable control circuit that makes the voltage input to the enable terminal the threshold voltage or greater when the direct-current voltage supplied from the power supply input line reaches a specified value.

By providing an enable control circuit, it is possible for the DC-DC converter IC to operate when the direct-current voltage supplied from the power supply input line reaches a specified value. Because of this, an IC starting operation is prevented when the direct-current voltage supplied from the power supply input line is lower than the specified value (e.g., a state in which the direct-current voltage value is unstable). As a result, a reliable, stable supply of power is realized by the DC-DC converter circuit.

According to another preferred embodiment of the present invention, the enable control circuit preferably includes a zener diode including a cathode that is connected to the side of the power supply input line and an anode that is connected to the side of the enable terminal, and when the input direct-current voltage supplied from the power supply input line becomes the specified value or greater, the zener diode inputs the voltage to the enable terminal.

Furthermore, according to yet another preferred embodiment of the present invention, the enable control circuit preferably includes a switching element provided between the zener diode and the enable terminal, and the switching element is on and off controlled by the IC that operates by receiving the direct-current voltage output by the DC-DC converter circuit.

In accordance with a further preferred embodiment of the present invention, a DC-DC converter circuit includes a DC-DC converter IC that inputs, via an input terminal connected to a power supply input line, a direct-current voltage converted from alternating-current voltage and supplied by the power supply input line, wherein the DC-DC converter IC outputs a direct-current voltage having a value that is stepped down by operation of the DC-DC converter IC, the DC-DC converter IC operates when a direct-current voltage of the minimum operating voltage or greater is input from the input terminal and a voltage of a specified threshold value or greater is input from an enable terminal, and the DC-DC converter circuit includes a signal line that connects the power supply input line and the enable terminal, a zener diode disposed in the signal line and including a cathode connected to a side of the power supply input line and an anode connected to a side of the enable terminal, and an enable control circuit that makes the voltage applied to the enable terminal the threshold value or greater as a result of the zener diode having voltage input to the enable terminal when the direct-current voltage supplied from the power supply input line becomes a specified value or greater that is higher than the minimum operating voltage, and the enable control circuit includes a transistor that is provided between the zener diode and the enable terminal and is on and off controlled by an IC that operates by receiving the direct-current voltage output by the DC-DC converter circuit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described while referring to the figures.

Figure 1:
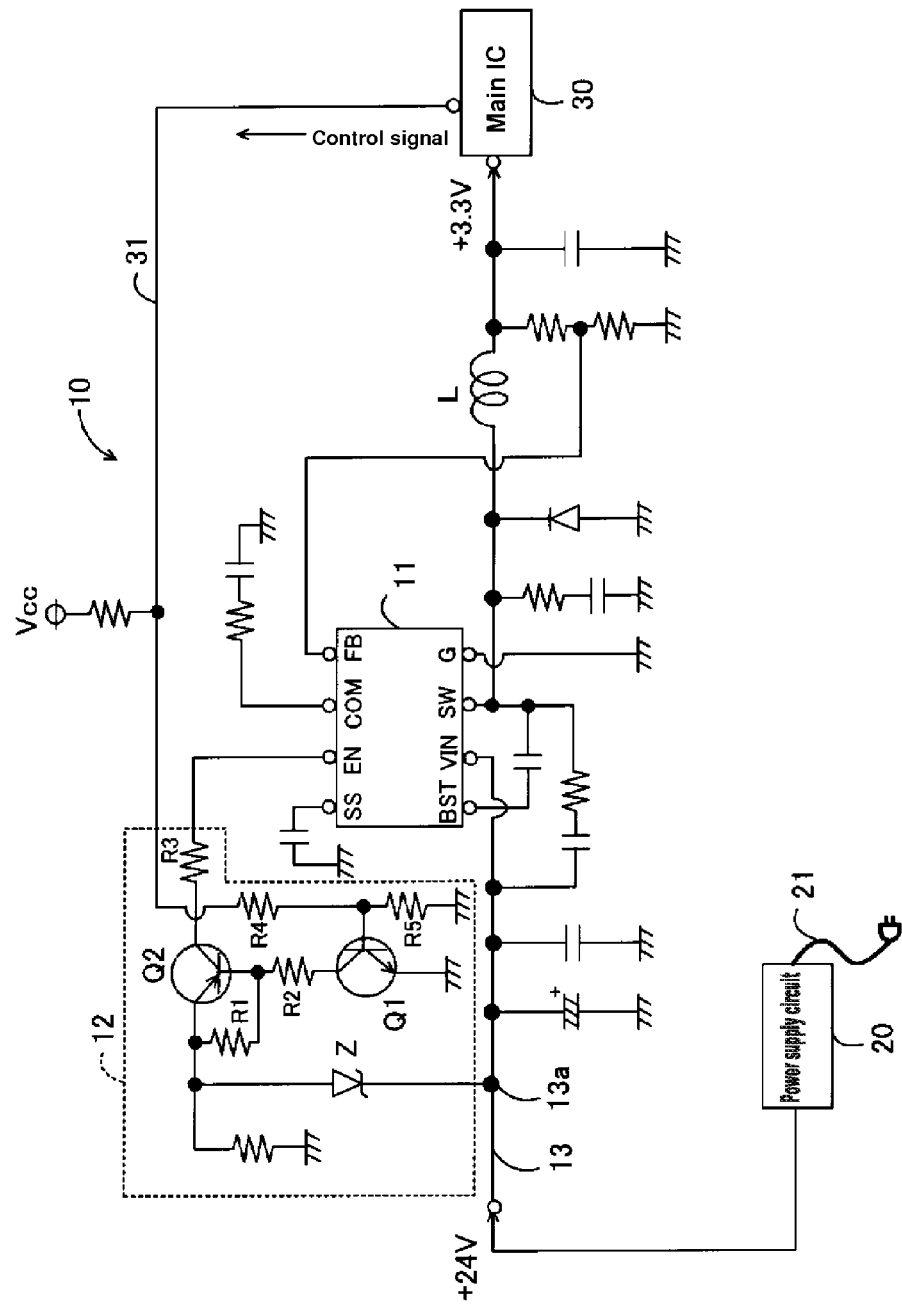
FIG. 1 is a diagram schematically showing a circuit configuration including a DC-DC converter circuit according to a preferred embodiment of the present invention.

FIG. 1 schematically shows a DC-DC converter circuit 10 of the present preferred embodiment. The DC-DC converter circuit 10 functions as a converter that has a direct-current voltage input from a power supply circuit 20 received via a power supply input line 13, converts this value, and outputs a different direct-current voltage as the power supply voltage to a later-stage circuit (e.g., a main IC 30). The power supply circuit 20 inputs alternating-current voltage received from an AC cord 21 inserted in an external commercial alternating-current voltage power outlet, and by performing voltage conversion, rectification, smoothing, and the like on the input alternating-current voltage, generates a direct-current voltage of a specified level (e.g., about +24 V), and has this direct-current voltage input to the power supply input line 13 of the DC-DC converter circuit 10. The power supply circuit 20 and the DC-DC converter circuit 10 constitute the power supply circuit provided in an electrical appliance. There are various appliances in which the DC-DC converter circuits 10 and the like are provided, such as televisions, DVD players/recorders, Blu-ray disc (BD) players/recorders, and the like. Furthermore, the main IC 30 is the major control unit for the electrical appliance and executes various control processes according to specified programs which have been loaded.

The DC-DC converter circuit 10 includes an IC 11 controlling the central functions of the DC-DC converter. The IC 11 preferably is a single chip IC with a built-in MOSFET and is provided with a plurality of terminals (pins), for example. The input terminal VIN of the IC 11 is connected to the power supply input line 13, and the +24 V direct-current voltage is input to the input terminal VIN via the power supply input line 13. Note that a capacitor (see FIG. 1) or the like to perform smoothing can be connected to the power supply input line 13 as appropriate. The IC 11 performs the operation of inputting the direct-current voltage from the input terminal VIN as well as outputting a pulse signal of a specified duty ratio from a switch terminal SW. By doing so, a stepped-down (converted) direct-current voltage according to the duty ratio of the pulse signal is output to a later stage of a choke coil L. In the present preferred embodiment, it is preferred that a +3.3 V power supply voltage, for example, is supplied to the main IC 30 by the DC-DC converter circuit 10.

In the IC 11, the minimum operating voltage value Vmin is set for the voltage that is input from the input terminal VIN, and the input voltage being the minimum operating voltage value Vmin or greater is one of the conditions for the IC 11 to operate. Moreover, the constitution is such that an enable signal (voltage) is input to the enable terminal EN of the IC 11, and the IC 11 is able to operate when an enable signal for which the voltage is a specified threshold value or greater is input. Specifically, the IC 11 operates only when an enable signal of the threshold value or greater is applied to the enable terminal EN (the enable terminal EN is on) and a voltage of the minimum operating voltage value Vmin or greater is applied to the input terminal VIN. In addition, the IC 11 is provided with a soft start terminal SS, a phase correction terminal COM, a feedback terminal FB, a boost terminal BST, and a ground terminal G. In FIG. 1, rather than showing all the connection statuses of each terminal and its periphery, the components and elements necessary for the present preferred embodiment are shown as appropriate.

One of the unique features of the present preferred embodiment is that an enable control circuit 12 is provided between the power supply input line 13 and the enable terminal EN. Such an enable control circuit 12 was not provided in the past (see FIG. 3). The enable control circuit 12 includes, preferably midway in the signal line that links the enable terminal EN and the connection point 13a on the power supply input line 13, a zener diode Z (zener diode Z reverse-connected to the +power supply). A cathode of the zener diode Z is connected to a side of the power supply input line 13, and an anode of the zener diode Z is connected to a side of the enable terminal EN. Furthermore, between the anode of the zener diode Z and the enable terminal EN, the enable control circuit 12 includes a PNP-type transistor Q2 the emitter of which is connected to the anode side of the zener diode Z, while the collector of the PNP-type transistor Q2 is connected to the side of the enable terminal EN, and a resistor R3 is interposed between the collector of the transistor Q2 and the enable terminal EN.

Moreover, a resistor R1 is connected in parallel to the emitter and base of the transistor Q2, and the collector of an NPN-type transistor Q1 is connected to the connection point of the resistor R1 and the base with a resistor R2 being interposed. The emitter of the transistor Q1 is connected to ground. In addition, the base of the transistor Q1 is connected to the dividing point by resistors R4 and R5 that are connected in series on a signal line 31. The signal line 31 is pulled up by the power supply voltage Vcc in a state in which the AC cord 21 is inserted in a power outlet, and the signal line 31 is further connected to the main IC 30.

The zener diode Z has a characteristic of flowing current to the anode side when voltage of a specified value Vs (zener voltage) or greater is applied to the cathode side, and the specified value Vs is, for example, approximately +15 V. The specified value Vs is a higher value than the minimum operating voltage value Vmin. In such a constitution, immediately after the AC cord 21 is inserted in a power outlet, the transistor Q1 changes to an ON state (electrically conductive between the collector and the emitter) as a result of a voltage based on the power supply voltage Vcc being supplied to the base, and the base potential of the transistor Q2 is also in a state pulled to ground, but while the potential of the power supply input line 13 has not yet risen to the specified value Vs, no current flows from the zener diode Z to the side of the enable terminal EN. On the other hand, when the potential of the power supply input line 13 reaches the specified value Vs after the AC cord 21 is inserted in the power outlet, current is generated from the cathode side of the zener diode Z to the anode side, and the current flows between the emitter and collector of the transistor Q2, so voltage is applied to the enable terminal EN. The voltage (enable signal) applied in this way to the enable terminal EN is equal to the threshold value or greater, and the enable terminal EN changes to an ON state, so the IC 11 starts operating normally. As a result, the stepped-down direct-current voltage from the DC-DC converter circuit 10 is output to the main IC 30.

Figure 2:
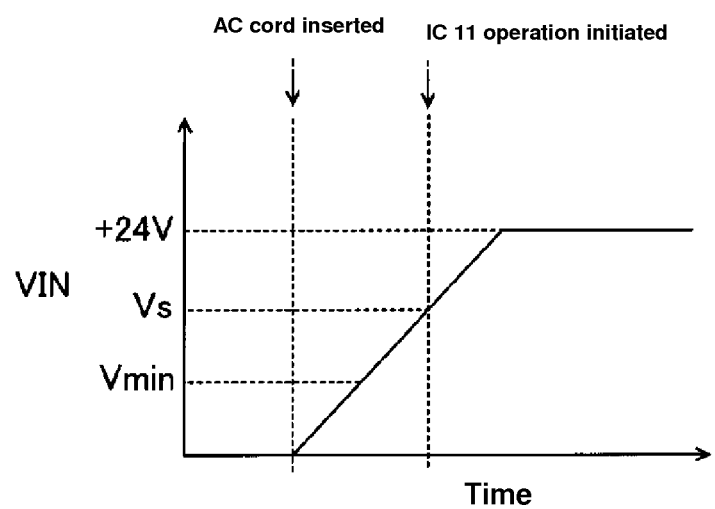
FIG. 2 is a diagram showing an example of voltage changes of the input terminal of an IC from immediately after an AC cord is inserted.

FIG. 2 shows an example of such voltage changes of the input terminal VIN of the IC 11 from immediately after the AC cord 21 is inserted. FIG. 2 shows, as a straight line for simplicity, the manner in which the voltage of the input terminal VIN rises from immediately after the AC cord 21 is inserted in a power outlet. The voltage of the input terminal VIN is substantially stabilized at +24 V after a certain period has elapsed from immediately after the AC cord 21 is inserted in the power outlet. Furthermore, if the voltage reaches the specified value Vs in the process of reaching +24 V, it can be presumed that there is no unstable behavior in the voltage of the input terminal VIN. If the voltage of the input terminal VIN reaches an extent of the specified value Vs, the enable terminal EN will change to an ON state as described above, and the IC 11 will start operating.

Thus, with the present preferred embodiment, as a result of the enable control circuit 12 being provided, the enable terminal EN of the IC 11 changes to an ON state when the direct-current voltage supplied from the power supply input line 13 reaches the specified value Vs which is higher than the minimum operating voltage value Vmin of the DC-DC converter IC 11, thus initiating the operation of this IC 11. This therefore reliably prevents the IC 11 from operating during a period when the voltage of the power supply input line 13 is still low and unstable immediately after the AC cord 21 is inserted in an external commercial alternating-current voltage power outlet. As a result, it is possible to prevent malfunction of the IC 11, disordered output values to a later-stage circuit (main IC 30) from the DC-DC converter circuit 10, and the like, so a stable supply of power is realized by the DC-DC converter circuit 10.

Note that after the supply of power supply voltage from the DC-DC converter circuit 10 to the main IC 30 starts and the main IC 30 is in an operating state, the enable signal can be controlled by the main IC 30. Specifically, the main IC 30 can switch the transistor Q1 on (and along with this, switch the transistor Q2 on) and off (and along with this, switch the transistor Q2 off) as a result of the control of the voltage value supplied to the base of the transistor Q1 by sending specified control signals to the signal line 31. Depending on such switching, the enable signal of the threshold value or greater can be given or not given to the enable terminal EN.

Figure 3:
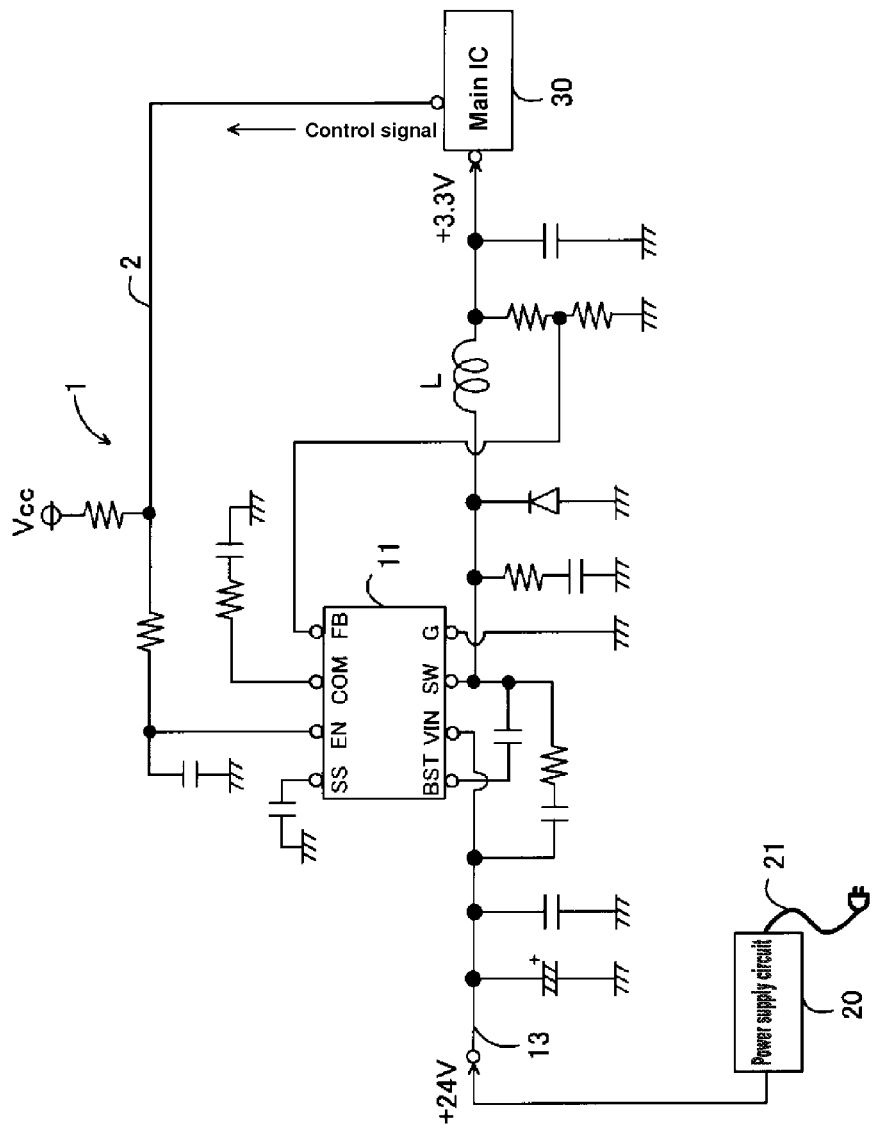
FIG. 3 is a diagram schematically showing a circuit configuration including a DC-DC converter circuit of the prior art.

FIG. 3 schematically shows a conventional DC-DC converter circuit 1 which is an example comparative to FIG. 1. With the conventional constitution, the enable control circuit 12 is not provided, and a signal line 2 extending from the main IC 30 is connected to the enable terminal EN of the IC 11, while the signal line 31 is pulled up by the power supply voltage Vcc in a state in which the AC cord 21 is inserted in a power outlet. In such a conventional constitution, simultaneously with the AC cord 21 being inserted in the power outlet, the enable terminal EN is changed to an ON state by the power supply voltage Vcc, so even during a period when the voltage of the power supply input line 13 is still low and unstable immediately after the AC cord 21 is inserted in the power outlet, if this voltage has even temporarily reached the minimum operating voltage value, the IC 11 will end up operating, and therefore an IC malfunction, an output value disorder, and the like, are likely to occur.

In contrast, with the present preferred embodiment of the present invention, by providing the enable control circuit 12 which includes the zener diode Z as described above, such problems are prevented from occurring.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC-DC converter circuit comprising:
   a DC-DC converter IC; and
   an enable control circuit arranged to receive a control signal; wherein
   the DC-DC converter IC is arranged to:
      input, via an input terminal connected to a power supply input line, a direct-current voltage converted from an alternating-current voltage and supplied by the power supply input line;
      output a direct-current voltage having a value converted by operation of the DC-DC converter IC; and
      operate when a voltage of a specified threshold value or greater is input from an enable terminal;
   the enable control circuit is arranged to make the voltage input to the enable terminal equal to the threshold voltage or greater when the direct-current voltage supplied from the power supply input line reaches a specified value;
   the control signal is input into the enable control circuit from a later stage circuit arranged to receive the output direct-current voltage;
   the enable control circuit includes a zener diode that includes a cathode connected to a side of the power supply input line and an anode connected to a side of the enable terminal, and when the input direct-current voltage supplied from the power supply input line becomes the specified value or greater, the zener diode inputs the voltage to the enable terminal; and
   the zener diode is arranged in series between the power supply input line and the enable terminal.

2. The DC-DC converter circuit according to claim 1, wherein the enable control circuit includes a switching element that is provided between the zener diode and the enable terminal and is on and off controlled by an IC that operates by receiving the direct-current voltage output by the DC-DC converter circuit.

3. A DC-DC converter circuit comprising:
   a DC-DC converter IC;
   an enable control circuit; and
   a zener diode; wherein
   the DC-DC converter IC is arranged to:
      input, via an input terminal connected to a power supply input line, a direct-current voltage converted from an alternating-current voltage and supplied by the power supply input line;
      output a direct-current voltage having a value stepped down by operation of the DC-DC converter IC; and
      operate when a direct-current voltage of a minimum operating voltage or greater is input from the input terminal and a voltage of a specified threshold value or greater is input from an enable terminal;
   the zener diode is disposed in a signal line connecting the power supply input line and the enable terminal;
   a cathode of the zener diode is connected to a side of the power supply input line;
   an anode of the zener diode is connected to a side of the enable terminal;
   the enable control circuit is arranged to make the voltage applied to the enable terminal equal to the threshold value or greater in response to the zener diode inputting voltage to the enable terminal when the direct-current voltage supplied from the power supply input line becomes equal to or greater than a specified value that is higher than the minimum operating voltage; and the enable control circuit includes a transistor that is provided between the zener diode and the enable terminal and is on and off controlled by an IC that operates by receiving the direct-current voltage output by the DC-DC converter circuit.

* * * * *